Sept. 20, 1971     L. PENDERGAST     3,606,407
BREAK-AWAY SHAFT
Filed April 7, 1970
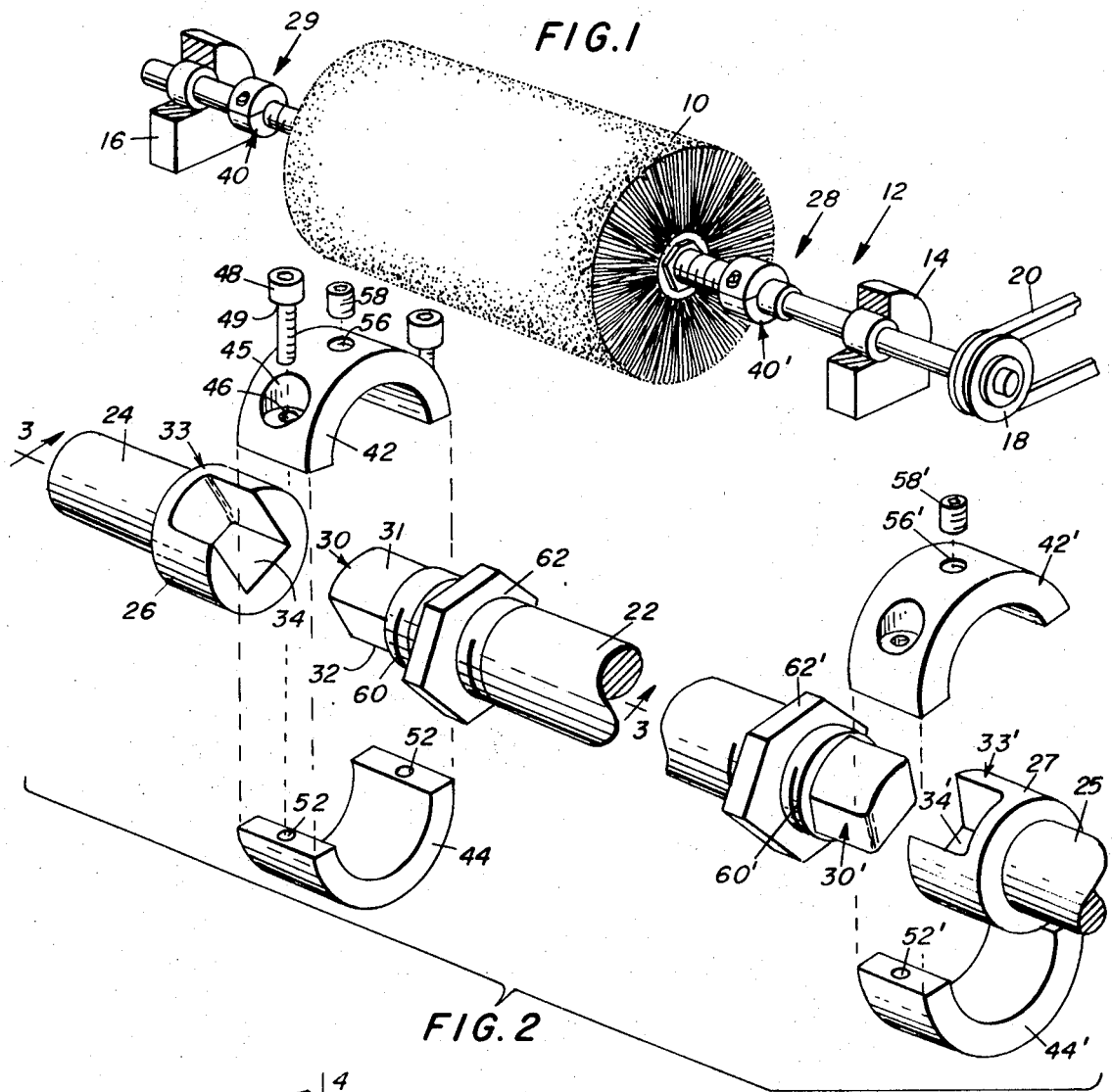
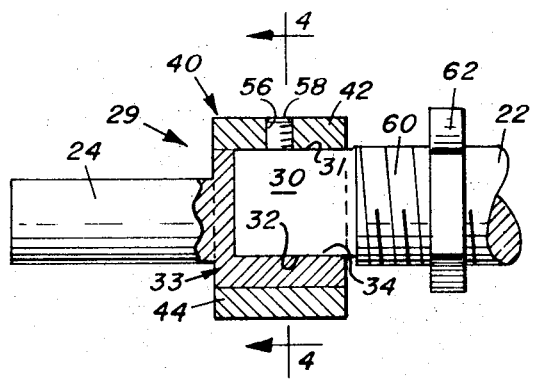
FIG. 3
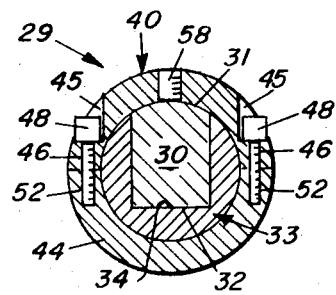
FIG. 4
INVENTOR
LAWRENCE PENDERGAST
BY Beale and Jones
ATTORNEYS

United States Patent Office 3,606,407
Patented Sept. 20, 1971

3,606,407
BREAK-AWAY SHAFT
Lawrence Pendergast, 3403 Division St.,
St. Cloud, Minn. 56301
Filed Apr. 7, 1970, Ser. No. 26,236
Int. Cl. F16d 1/06
U.S. Cl. 287—52.01                                4 Claims

ABSTRACT OF THE DISCLOSURE

The subject disclosure relates to a break-away shaft which permits a tool such as a brush, grinding or polishing wheel or the like to be removed from a machine shaft without the necessity of disassembling the machine and removing the shaft from the machine bearings. The break-away shaft comprises a center shaft having shaped ends which are inserted into two shaft stubs having corresponding shaped recesses so that a torque transferring joint is formed. The shaft stubs are separately mounted in spaced machine bearings, with one of the shaft stubs extending through its bearing mounting for engagement by a driving means. A removable securing collar encircles each joint to hold the joint in position and the center shaft portion in alignment with the stubs. A holding member is carried on each end of the center shaft to secure a tool mounted on the center shaft.

BACKGROUND OF THE INVENTION

The subject invention relates in general to a new shaft construction and, in particular, to a break-away shaft which can be used with any type machine where the removal of a rotary driver shaft may be required. Machines which utilize a tool such as a brush, grinding or polishing wheel or the like are of particular concern for the present shaft permits the removal of such tools for replacement or maintenance without the necessity of disassembling the machine and removing the shaft from the machine shaft mounting bearings, as is the case with present shaft structures.

In most of the presently known machines where a tool is carried on a rotary shaft, the shaft is a unitary member often connected directly to a drive motor and mounted at each end in a bearing. With this type of mounting, it is necessary to remove the shaft from the machine to change the type of tool being used or to replace a worn tool. This routine maintenance or replacement usually requires the following steps: removal of the machine housing, disengaging the shaft from the driving means, removing the shaft from the machine bearings which hold the shaft in position, and removing the tool from the shaft, then reversing these steps to put a new tool in the machine. As can be seen, this results in a considerable amount of machine down-time which, in turn, has an adverse, and in some cases an intolerable effect on the entire business operation, especially where there is only one machine used in the business operation, or where down-time results in a large loss of production or in substantial wasted time for labor.

In order to prevent some of this down-time, the steps of removing the tool from the shaft and replacing it have been eliminated by two alternatives. The first alternative was to have two shafts so that a tool was mounted on the second shaft and ready for installation, and the second alternative was to make the shaft and tool a single unit. One drawback to these alternatives was the increased costs, for the first alternative requires additional spare parts and the second alternative increases the cost of the tools. Also, either of these alternatives eliminated only a small fraction of the down-time, since the major part of the work involves removal of the shaft, and replacing the tool on the shaft is the simplest and least time consuming step. Therefore, a device which will reduce the steps required for removing the shaft from the machine is needed in order to eliminate the majority of the maintenance down-time for a machine with this type of shaft-carried tool.

An example of a machine in which the above-mentioned downtime would be a problem is the present day car washing apparatus. Many of the car washing devices presently in use utilize cylindrical rotary brushes for scrubbing the roof and sides of a car being towed through the apparatus. These brushes are usually mounted on a unitary shaft which would require that the shaft be completely removed from the machine before the brush can be replaced. This requires that the entire car washing operation be halted, idling many workers until the brushes are replaced. Although a car washing machine is only one of the many different types of machines which uses tools such as brushes or grinding wheels mounted on shafts, it is illustrative of the problems which the present invention was devised to overcome.

From the foregoing, it can be seen that there has existed a need for a break-away shaft which can be used in numerous types of machines utilizing shaft mounted tools such as brushes, grinding wheels and the like, so that the down-time required for changing the type of tool or replacing a worn tool can be minimized.

SUMMARY OF THE INVENTION

It is therefore, an object of this invention to provide a break-away shaft which will permit the replacement of a shaft mounted brush or tool to minimize the amount of machine down-time.

Another object of this invention is to provide a break-away shaft which will permit a brush or tool to be replaced without removing the shaft from the machine bearing.

Still another object of this invention is to provide a break-away shaft joint which will transmit a torque force along the shaft.

Still another object of this invention is to provide a breakaway shaft which is durable, efficient, economical and easy to manufacture.

These and other objects are accomplished by the present invention through the use of a sectioned shaft having a center section and two end stub sections. The stub shafts are mounted in spaced machine bearings, and one of the stub shafts extends through its bearing and is engaged by a driving means. The center shaft section has shaped ends which are adapted to be inserted in complementary recesses in the stub shafts, thereby forming joints or connections which will transmit a torque or rotary force. Each joint is held by a split securing collar which encircles the shaft at the joint. One half of each split collar carries a set screw which, when tightened, will contact the shaped ends of the center shaft and hold the shaped ends in contact and alignment with the stub shafts. The center shaft has a threaded portion contiguous to each of the shaped ends so that a holding nut can be screwed onto the shaft on each side of a tool to hold the tool in the proper position on the shaft.

BRIEF DESCRIPTION OF THE DRAWINGS

The foregoing and additional objects, features and advantages of the invention will be apparent to those skilled in the art by the following detailed description of a preferred embodiment taken with the accompanying drawings, in which:

FIG. 1 is a perspective view of shafts-mounted wire brush showing the shaft of the present invention mounted for rotation in the bearings of a machine;

FIG. 2 is an enlarged exploded perspective view showing one embodiment of a break-away shaft including two shaft joints in accordance with the present invention;

FIG. 3 is a cross-sectional view taken on line 3—3 of FIG. 2, showing the shaft joint of the embodiment of FIG. 2; and FIG. 4 is a cross-sectional view taken on line 4—4 of FIG. 3, showing the shaft joint of the embodiment of FIG. 2.

DESCRIPTION OF A PREFERED EMBODIMENT

Referring more particularly to the drawings in FIG. 1, the numeral 10 illustrates a rotary tool such as an ordinary fiber brush, wire brush, grinding wheel or the like which is carried on the break-away shaft, in turn, being fixedly mounted in the bearings 14 and 16 of any type machine which uses a shaft mounted tool. The break-away shaft extends through bearing 14 and has a sprocket, pulley or other suitable drive means 18 secured thereto. An endless link chain or drive belt 20 engages the drive means 18, and the chain, or belt, is driven by an appropriate means (not shown), whereby the shaft 12 may be rotated. The shaft can also be driven by a suitable motor such as an electric motor, either directly or through a system of gears, and the particular manner in which the shaft is driven is not material to the invention.

Considering the present invention in more detail, it can be seen in FIG. 2 that the break-away shaft 12 includes a center shaft portion 22, a mounting stub shaft or section 24 and a mounting and drive stub shaft end or section 25. The center shaft and the two stub shafts are joined at two interlocking torque transfer joints or connections 28 and 29. The stub shaft sections 24 and 25 have enlarged end portions 26 and 27, respectively, although the cross-sections of the stub shaft can be uniform if desired. The shaft sections will normally be made of the same material, and can be made in any cross-section configuration desired (i.e., round, square, rectangular, etc.); however, in this preferred embodiment, a round cross-section is used because fewer problems are encountered with respect to vibration in the shaft and alignment of the shaft sections. Since the joints 28 and 29 must withstand a relatively high torque force, steel would be a suitable material to use in making the shaft sections although any other material which could withstand the torque force required for a particular application can be used.

In order to assure the transfer of torque from the drive means through the stub shaft and thence to the center portion of the break-away shaft by way of the joints 28 and 29, the end portions or tips 30 and 30' (see FIG. 2) at the ends of the center shaft portion 22 are provide with a rounded configuration in this preferred embodiment, although a square, T-shaped, etc. configuration will work equally as well. The tip 30 (see FIG. 4) has a curved outer surface 31 and a flat inner surface 32, and tip 30' is of similar configuration. The tips 30 and 30' of the center shaft are inserted into recesses 33 and 33' which are complementary to the shaft of the corresponding tips, and more particularly are milled U-shaped slots in the enlarged end portions 26 and 27, respectively, of the stub shaft 24 and 25. The milled slot 33 has a flat bottom 34 (see FIGS. 3 and 4) which abuts the inner flat surfaces 32 of the tip 30 when the tip is inserted in the slot 33, and slot 33' is of a similar configuration. The curved outer surface 31 of the tip 30 forms a continuous cylindrical surface with the enlarged portion 26 of the stub shaft 24. When the center shaft is inserted into the stub shafts, the slots 33 and 33' must be positioned so that the flat bottoms 34 and 34' of the slots 33 and 33' are in the same plane.

The torque transfer joints 28 and 29 are held together by a pair of identical split securing collars 40 and 40', each collar includes upper and lower half members 42 and 44 that encircle the cylindrical joint so that tips 30 and 30' will not slide transversely out of the slots 33 and 33' when the shaft is rotated about its axis, while the bearing mounts prevent the shaft from sliding out a longitudinal direction. The collar will fit over the enlarged portion of the stub shafts. The upper half member 42 is positioned over the joint 33 so that it contacts the stub shaft 26 and the center shaft tip 30, the high point of the half member being centered over the slot 33 in the stub shaft 24. A notch 45 is located on each side of half member 42 and has a threaded aperture 46 located therein; the aperture 46 extends through the upper half member 42 and receives a fastener 48 such as an Allen head bolt. The fastener 48 has a shoulder 49 which contacts the flat portion 50 (see FIG. 4) of the notch 45. The lower half member 44 has threaded apertures 52 which receive the fastener 48 so that as the fasteners 48 are tightened, the half member 44 is pulled into engagement with the outer surface of the stub shaft, thereby clamping the tip 30 in slot 33. A threaded aperture 56 at the high point of the arch of half member 42 receives a set screw 58 which, when tightened, contacts tip 30 to assist in holding the joint together.

FIG. 1, which shows the brush 10 mounted on the shaft 12, also, illustrates one means which can be used to prevent the brush from rotating with respect to the shaft 12. The brush securing means includes a threaded portion 60 at each end, contiguous to an inwardly extending from the tips 30 and 30' of the center shaft and a holding member such as an ordinary nut 62 is screwed on the threaded portion and contacting the brush 10. The holding member prevents the brush from rotating with respect to the shaft and positions the brush on the shaft. Any other appropriate means can be used to keep the brush from rotating with respect to the shaft such as set screws, a cotter pin, key and slot, etc.

When it becomes necessary to change or replace a tool on a machine in which this break-away shaft is utilized, the operation of removing the tool is relatively simple and requires virtually no down-time. First, the securing collars 40 and 40' are removed from the joints 28 and 29, then the center shaft 12 with the tool 10 mounted thereon is removed from the stub shafts 24 and 25 and finally the holding nuts are removed from the center shaft. The new tool is then mounted on the center shaft with the holding nut so that center shaft can be replaced in the stub shafts and secured by the split collars 40 and 40'.

It can be seen from the above description and drawings, that the break-away shaft construction provides an easy method of removing a shaft-mounted tool from a machine without removing the shaft from the bearings, provides a unique joint which will transmit a torque force along the shaft and provides a break-away shaft which will minimize down-time when replacement of the tool becomes necessary.

The described embodiment can be modified in numerous ways, as will be apparent from the foregoing. For example, it is within the skill of the art to vary the material from which the shaft is made, the shape of the joint, the fastener holding the collar together, or the means for driving the shaft. The shaft can also be used in either a vertical and horizontal rotating position. However, these and other variations and changes can be made in the invention as above described and illustrated without departing from the true spirit and scope thereof as defined in the following claims.

What is claimed is:

1. A break-away shaft for a machine, said shaft carrying a rotary tool and being mounted between spaced first and second machine bearings, comprising:
    (a) a center rod member for carrying said tool, said center member having first and second tip portions with a flat surface and a curved surface;
    (b) first and second stub rod members mounted in said first and second machine bearings, respectively, said first and second stub members having first and second U-shaped recesses, respectively, to receive said first and second tip portions of said center member, said first and second recesses having flat bottoms which abut said flat surfaces of said first and second tips so that the curved surfaces of said tips form continuous outer surfaces with said stub members; and (c) releasable means for connecting said center member to said first and second stub members, said releasable means includes first and second interlocking connections contiguous to said first and second machine bearings, respectively, said first interlocking connection being between said center member and said first stub member and said second interlocking connection being between said center member and said second stub member.

2. The break-away shaft of claim 1, wherein each of said first and second interlocking connections includes a split collar having first and second half members encircling said connection, said collar having securing means to hold said half members around their corresponding interlocking connection.

3. The break-away shaft of claim 1, further including means for holding said tool to said center member to prevent said tool from rotating with respect to said center member and to position said tool on said center member.

4. The break-away shaft of claim 3, wherein said holding means includes:

(a) threaded portions on the center shaft contiguous to and extending inwardly from the tips of said center member; and (b) a nut screwed on each of said threaded portions which will contact each side of said tool and prevent said tool from rotating with respect to said center member with the break-away shaft is rotated.

References Cited

UNITED STATES PATENTS

| 26,387 | 12/1859 | Vanderenter | 242—68.4 |
| 874,267 | 12/1907 | Wagner | 287—52.07 |
| 1,142,296 | 6/1915 | Bellerose | 287—52.07X |
| 1,989,988 | 2/1935 | Jones | 308—20X |
| 2,504,240 | 4/1950 | Wooley | 242—68 |
| 2,735,240 | 2/1956 | Longee et al. | 279—1 |
| 2,954,182 | 9/1960 | Bojanower | 279—1X |

REINALDO P. MACHADO, Primary Examiner

A. KUNDRAT, Assistant Examiner

U.S. Cl. X.R.

242—68.4